Feb. 9, 1960  C. D. MORRILL  2,924,709
ABSOLUTE VALUE COMPARATOR
Filed July 1, 1955
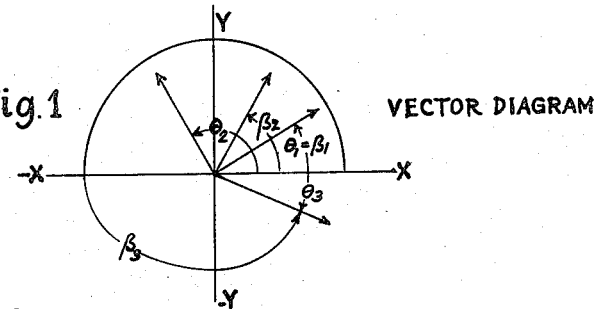
Fig. 1  VECTOR DIAGRAM
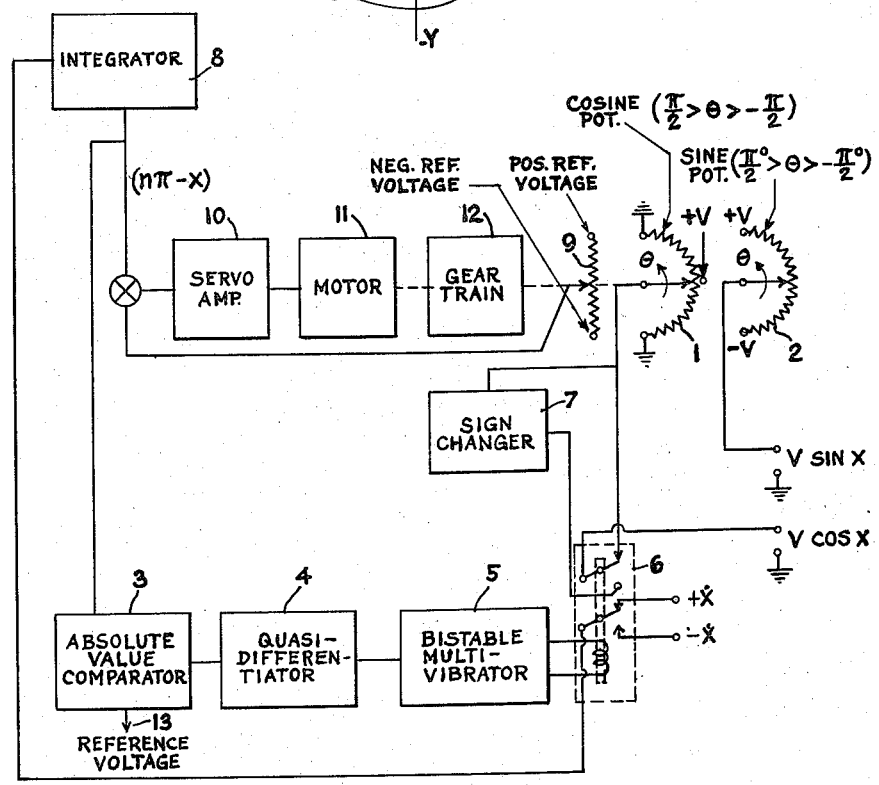
Fig. 2  GENERATION OF V sin Ψ AND V cos Ψ
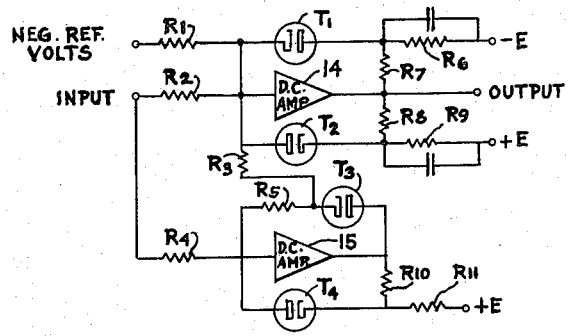
Fig. 3  ABSOLUTE VALUE COMPARATOR
INVENTOR.
Charles D. Morrill
BY
ATTORNEY

United States Patent Office 2,924,709
Patented Feb. 9, 1960

2,924,709
ABSOLUTE VALUE COMPARATOR

Charles D. Morrill, Cuyahoga Falls, Ohio, assignor to Goodyear Aircraft Corporation, Akron, Ohio, a corporation of Delaware Application July 1, 1955, Serial No. 519,368

2 Claims. (Cl. 250—27)

This invention relates to analog computors and especially to the forming of direct voltage corresponding to the value of a variable quantity of which a function is an unlimited angle. The invention is particularly concerned with an absolute value comparator.

In the construction of analog computing devices it is often necessary to provide means for generating a function of an angle which is unlimited. Apparatus required for this purpose has heretofore required mechanism including a tachometer which does not provide sufficiently accurate results as the voltage provided thereby is not of sufficiently high accuracy as compared to the angular velocity and also because of acceleration and velocity limits of the motor dynamic performance has not always been sufficient to satisfy requirements. Also, the more accurate tachometers at present available require A.C.-D.C. and/or D.C.-A.C. conversion or else are large and expensive and permit only relatively small values of $\dot{x}$ in angular velocity.

Also, such apparatus as has been known for producing a voltage A, when $A \cos \theta$ and $A \sin \theta$ are known, has had the disadvantage of requiring continuous sine and cosine potentiometers. No method of producing a continuous, repetitive sine or cosine function generator electronically is apparently known, therefore, potentiometers or similar mechanical units have been required in such apparatus.

The present invention has for an object the provision of an improved absolute value comparator for use in overcoming the foregoing and other difficulties.

Another object is to provide an absolute value comparator capable of use, for example, in forming a direct voltage proportional to a function of an unlimited angle.

These and other objects will appear from the following description and the accompanying drawings.

Fig. 1 is a vector diagram for purposes of illustrating the method.

Fig. 2 is a diagrammatic layout of apparatus for generating $V \sin x$ and $V \cos x$ from V, $\dot{X}$ and $-\dot{X}$, and utilizing the absolute value comparator of the invention.

Fig. 3 is an embodiment of the absolute value comparator used in Fig. 2.

Referring to the drawings, the invention constitutes a novel absolute-value comparator shown in conjunction with a rise-rate amplifier (quasi-differentiator), a bistable multivibrator, and one or more relays and/or electronic switches. The comparator of the invention will be best understood by having reference to a typical circuitry application, in itself believed novel, and comprising a basic method of achieving vector resolutions and addition involving unlimited angles and in the construction of the absolute value comparator.

The circuitry is based upon the fact that where $n$ equals the number of tangencies a rotating vector makes with the Y—Y axis, the following mathematical expressions are true:

$$\sin \theta = \sin (n\pi - \theta)$$
$$\cos \theta = -\cos (n\pi - \theta)$$

To clarify the basic method, suppose that there is a rotating vector making an angle $\theta_1$ with the X-axis as shown in Fig. 1. Suppose also that whenever the vector touches the Y-axis, the sign of $\theta$ is reversed. Each time there is tangency between the vector and the Y-axis, a new vector is produced which alternately is the Y-reflected image of the true vector and coincides with the true vector. The new vector makes an angle $\beta$ with the X-axis. Obviously $\beta$ lies between $-\pi/2$ and $+\pi/2$ and, when $\theta$ lies in that region, $\beta = \theta$. If $\theta$ exceeds $\pi/2$, say $\theta_2$, the angle of the new vector is $\beta_2$. It may be seen that $$\theta_2 - \beta_2 = 2(\theta_2 - \pi/2)$$
$$\beta_2 = (\pi - \theta_2)$$
$$\sin \beta_2 = \sin (\pi - \theta_2) = \sin \theta_2$$

The same reasoning applies when the vector lies in the 4th quadrant, in which case:

$$\sin \beta_3 = \sin (2\pi + \theta_3) = \sin \theta_3$$
$$\sin \beta = \sin (n\pi + (-1)^n \theta) = \sin \theta$$

where $n$ is an integer whose magnitude (positive or negative) depends on the number of times the original vector touches the Y-axis and on the sign of $\theta$ at each tangency.

Similarly, $$\cos \beta = \cos (n\pi + (-1)^n \theta) = \begin{matrix} \cos \theta \text{ when } n \text{ is even} \\ -\cos \theta \text{ when } n \text{ is odd} \end{matrix}$$

Thus, every time the vector touches the Y-axis, the sign of the $\cos \beta$ term must be changed in order to be equivalent both in magnitude and sign to $\cos \theta$. The method is employed in this invention is illustrated in Fig. 2 by a diagrammatic showing of apparatus which meets the mathematical requirements. For simplicity, the circuit of Fig. 2 shows servo-driven sine and cosine potentiometer and relays; however, the method is not limited to such units, and electronic sine and cosine function generators and multipliers and electronic switches may be used. Note that a necessary although not sufficient, condition for switching is that $V \cos x = 0$. Thus, if the switching is sufficiently rapid and the limits of the servo have not been exceeded, no switching transient occurs.

Referring to Fig. 2, assume that, initially, $x = \dot{x} = 0$. The cosine potentiometer 1 produces an output at its movable contact equal to $\cos x$ as long as $x$ lies between $-\pi/2$ and $+\pi/2$. Similarly, potentiometer 2 produces a voltage $\sin x$ as long as $x$ lies between $-\pi/2$ and $+\pi/2$. As long as $x$ lies between $-\pi/2$ and $+\pi/2$, circuitry well known to the art could be used, and the absolute value comparator 3, quasi-differentiator (rise rate amplifier) 4, bistable multivibrator 5, relay 6, and sign changer 7 would not be required. However, many problems do involve angles in excess of $-\pi/2$ and $+\pi/2$. Assume that the switch contacts of the relay 6 are as shown. $\dot{x}$ is applied by relay 6 to the input of the integrator 8. Since there have been no tangencies as the arm of potentiometer 9 is at or near the center of its throw, $n$ in the expression $(n\pi - x)$ is zero and the output of the integrator 8 is $-x$. This value of $-x$ is compared with the quantity generated at the movable arm of the linear potentiometer 9; any error difference between these quantities is amplified by the servo amplifier 10 producing a voltage to turn the motor 11 to drive, through a gear train 12 the linear potentiometer 9 until the error is zero. The movable arm of the potentiometer 9 is thus positioned mechanically to an angle $x$. Mechanically ganged to the linear potentiometer 9 are the cosine potentiometer 1 and the sine potentiometer 2. If, as shown, $+v$ and $-v$ are applied to these potentiometers, the outputs will be $v \cos x$ and $v \sin x$. When the value of $x$ approaches a voltage representative of either $+\pi/2$ or $-\pi/2$ as a result of movement of the arm of potentiometer 9 to a position near an end of its throw the reference voltage 13, the output of the absolute value comparator 3 reverses sign in a manner to be described later. This reversal is quasi-differentiated and may be amplified thus producing a voltage spike which alternates the state of the bistable multivibrator 5 reversing relay 6. Now when the relay is thus reversed, $-\dot{x}$ is applied to the integrator 8. At this point $v \cos x$ is zero regardless of the value of $v$, because the arm of potentiometer 1 is near an end of its throw and the ends of this potentiometer are grounded. The sign of $v \cos X$ is reversed through the sign changer 7 by the reversal of relay 6 which cuts the sign changer in and out of the output of potentiometer 1 and, as $x$ increases, negative values of output are produced at the terminals marked $v \cos x$. Reversals in the sign of $v \sin x$ occur at $n\pi$ and reversing the direction of rotation of the potentiometer 2 is all that is required and is accomplished in the manner described above. Thus, for the particular circumstances assumed, the desired results have been achieved. Other circumstances—different initial conditions, time varying values of $\dot{X}$, etc.—do not alter the operating method. It will be apparent to those skilled in the art that the servo unit 10, 11, 12, 9, 1 and 2 may be replaced by electronic function generators and electronic multipliers and that relay 6 may be replaced by an electronic switch. Thus, the entire method may be used, with appropriate substitutions, at speeds above those possible with mechanical and electro-mechanical systems.

Except for the absolute value comparator, the remainder of the circuit components are well known to the electronic art. The absolute value comparator of the present invention is illustrated in Fig. 3. With reference to Fig. 3, the absolute value comparator makes use of a plurality of D.-C. amplifiers 14 and 15. Amplifier 14 has a feed back circuit including a resistor $R_7$ and a diode $T_1$, and another feed back circuit including a resistor $R_8$ and a diode $T_2$, the diodes $T_1$ and $T_2$ being reversed in polarity relative to each other with the cathode of $T_1$ and the anode of $T_2$ being directly connected to the summing point of the amplifier 14. Also a negative voltage $-E$ is applied to the anode of $T_1$ through a resistor $R_6$ having a capacitor bridging it, and a positive voltage $+E$ is applied to the cathode of $T_2$ through a resistor $R_9$ having a capacitor bridging it.

Amplifier 15 has a feed-back circuit including a diode $T_3$ and a resistor $R_5$, and another feed-back circuit including a diode $T_4$ and a resistor $R_{10}$, the diodes $T_3$ and $T_4$ being reversed in polarity relative to each other. Also a positive voltage $+E$ is applied to the cathode of $T_4$ through a resistance $R_{11}$.

The cathode of $T_3$ is connected to the anode of $T_2$ and consequently to the summing point of amplifier 14 through a resistor $R_3$.

The input voltage, which is the output voltage of the integrator 8, Fig. 2, is applied to amplifier 14 through a resistor $R_2$ and to amplifier 15 through a resistor $R_4$. A negative reference voltage corresponding to $$\frac{\pi}{2}$$

is applied to amplifier 14 through a resistor $R_1$. The output is taken off from amplifier 14 at the junction of resistors $R_7$, $R_8$. Now as the amplifiers invert the sign of all signals appearing at the summing junction, that is for position voltages (with respect to ground) at the summing junction, negative voltages will appear at the output, in other words, at junction of $R_{10}$ and $T_3$ for amplifier 15. If the input to amplifier 15 is positive, its output will be negative. $T_4$ then conducts and all of the input current flowing through $R_4$ flows through $T_4$ and into the $R_{10}$, $R_{11}$ network. Virtually no current flows from the summing junctions into the amplifiers. The amplifier has not saturated since values of $R_{10}$, $R_{11}$ and $E$ can be easily selected to prevent an excessive negative voltage swing at the output of amplifier 15. The negative voltage swing is just sufficient to overcome the effect of $+E$ to permit $T_4$ to conduct. Since neither amplifier is saturated both summing junction voltages are negligible. This is true because the amplifier gains are so large (generally 100,000 to 500,000 times) that unless the amplifier saturates, and it doesn't in the present application, the voltage at the summing junction is exceedingly small and may be neglected for all practical applications. Therefore, summing junction voltages being negligible, they may be assumed to be at ground potential for all practical purposes. Since $R_5$ and $T_3$ connect a ground potential to a negative potential, $T_3$ is nonconducting or cut-off and may be considered out of the circuit. Hence, $R_3$ and $R_5$ are in series between two points each of which is at ground potential, and therefore no current will flow.

The output amplifier has only two stable output voltages. For this purpose, resistors $R_1 = R_2 = R_4 = R_5 = 2R_3$. Resistors $R_{10}$ and $R_{11}$ and voltage $E$ are of such values that whenever the input is positive, the output of amplifier 15 is negative by a sufficient amount to cut off $T_3$. Amplifier 15 thus passes only negative input signals to amplifier 14 by way of $T_3$ and $R_3$, reversing the sign of these inputs in the process. The net current supplied to the summing node of amplifier 14 through $R_2$ and $R_3$ is always positive and is precisely proportional to the absolute value of the input voltage. If the absolute value of the input voltage is less than the magnitude of the negative reference voltage, the output of amplifier 14 will be positive, its magnitude being determined almost entirely by the values of $-E$, $R_6$ and $R_7$.

When the absolute value of the input voltage exceeds the reference by the smallest amount, the output of amplifier 14 switches to a negative value determined by the values of $+E$, $R_8$ and $R_9$. Thus the desired result has been accomplished in providing a circuit the output of which is normally positive but becomes negative each time the absolute value of the input becomes equal to a fixed reference, in this case, a value corresponding to $\pi/2$.

Thus a desirable result has been achieved in a new way.

While a certain representative embodiment and details have been shown for the purpose of illustrating the invention, it will be apparent to those skilled in this art that various changes may be made therein without departing from the spirit or scope of the invention.

I claim:

1. An absolute value comparator comprising two direct current amplifiers, a single input connected to both amplifiers, a diode and resistor means, the output of one of said amplifiers being connected through said diode and resistor means to the summing node of the other amplifier to pass only negative input signals to said other amplifier, negative reference voltage supply means connected to said summing node whereby the net current supplied to the summing node from the input and the output of said one amplifier is always positive and proportional to the absolute value of the input voltage, R-C networks, means supplying positive and negative supply voltages through the R-C networks to the output of said other amplifier so that when the absolute value of the input voltage is less than the magnitude of the reference voltage the output of said other amplifier will be positive and when the absolute value of the input exceeds the reference voltage the output switches to negative.

2. An absolute value comparator comprising two direct current amplifiers, a single input separately connected to both amplifiers, a resistance in the input connection to each amplifier, a pair of feedback circuits for each amplifier including a diode with the feedback diodes of each amplifier arranged in opposite polarity, the output of one amplifier being connected to the summing point of the other through a diode of one of its feedback circuits in a manner to pass only negative signals to the input of the other amplifier, a negative reference voltage, resistance means connecting the reference voltage to the summing point of said other amplifier, R-C networks, means supplying positive and negative supply voltages through the R-C networks to the output of said other amplifier whereby when the absolute value of the input voltage is less than the magnitude of the reference voltage the output is positive and when the absolute value of the input exceeds the reference voltage the output switches to negative.

References Cited in the file of this patent

UNITED STATES PATENTS

| | | |
|---|---|---|
| 2,762,914 | Peterson et al. | Sept. 11, 1956 |
| 2,808,987 | Speller et al. | Oct. 8, 1957 |
| 2,815,169 | McKinney et al. | Dec. 3, 1957 |
| 2,819,397 | Davis | Jan. 7, 1958 |

OTHER REFERENCES

Electronics (Morrill et al.), November 1952, pages 122 to 126.